(12) United States Patent
Kwon et al.

(10) Patent No.: US 7,051,595 B2
(45) Date of Patent: May 30, 2006

(54) MONOLITHIC MULTI-FUNCTIONAL INTEGRATED SENSOR AND METHOD FOR FABRICATING THE SAME

(75) Inventors: Sang-wook Kwon, Seongnam-si (KR); Jong-hwa Won, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/150,212

(22) Filed: Jun. 13, 2005

(65) Prior Publication Data

US 2005/0274193 A1    Dec. 15, 2005

(30) Foreign Application Priority Data

Jun. 11, 2004    (KR)    .................. 10-2004-0042873

(51) Int. Cl.
*G01L 19/04*    (2006.01)
*G01L 9/06*    (2006.01)

(52) U.S. Cl. ......................................... 73/708; 73/727

(58) Field of Classification Search .................. 73/708, 73/720, 721, 726, 727; 338/3, 4, 9, 42; 29/25.35, 29/846

See application file for complete search history.

(56) References Cited

U.S. PATENT DOCUMENTS

| 4,320,664 | A | * | 3/1982 | Rehn et al. | .................... | 73/708 |
| 5,537,882 | A | * | 7/1996 | Ugai et al. | ..................... | 73/727 |
| 5,583,295 | A | * | 12/1996 | Nagase et al. | ................ | 73/708 |
| 6,748,635 | B1 | * | 6/2004 | Sumi et al. | ................ | 29/25.35 |

FOREIGN PATENT DOCUMENTS

| JP | 2002-48607 A | 2/2002 |
| JP | 2004-85304 A | 3/2004 |

* cited by examiner

*Primary Examiner*—William Oen
(74) *Attorney, Agent, or Firm*—Sughrue Mion, PLLC

(57) ABSTRACT

A monolithic multi-functional integrated sensor and method for making the monolithic multi-functional integrated sensor. The monolithic multi-functional integrated sensor includes: a pressure sensor including a plurality of piezoresistors having resistance values which vary with a change in external pressure, the piezoresistors being disposed in a direction so as to be subject to a piezoresistive effect produced by the external pressure at or beyond a predetermined first level; and a temperature sensor including a resistor having a resistance value which varies with a change in temperature, the resistor being disposed in a direction so as to be subject to a piezoresistive effect produced by the external pressure below a predetermined second level.

20 Claims, 5 Drawing Sheets

MONOLITHIC MULTI-FUNCTIONAL INTEGRATED SENSOR AND METHOD FOR FABRICATING THE SAME

CROSS-REFERENCE TO RELATED APPLICATIONS

This application claims the benefit of Korean Patent Application No. 2004-42873 filed Jun. 11, 2004, in the Korean Intellectual Property Office, the disclosure of which is incorporated herein by reference.

BACKGROUND OF THE INVENTION

1. Field of the Invention

The present invention relates to a monolithic multi-functional integrated sensor and a method for fabricating the same, and more particularly, to a monolithic multi-functional integrated sensor in which a pressure sensor and a temperature sensor are integrated on one chip using Micro Electro Mechanical System (MEMS) technology and a method for fabricating the same.

2. Description of the Related Art

MEMS technology embodies mechanical parts as an electric element using a semiconductor process. Machines or equipment having an ultrastructure of less than several μm can be designed using MEMS technology. Thus, MEMS technology is expected to bring about a large reform in entire industrial fields such as the electronic, mechanical, medical, or defense industries. In particular, sensors can be generally made subminiature using currently popular MEMS technology and built in various compact devices such as mobile phones or the like to sense and provide various kinds of information.

A pressure sensor senses an external pressure. An error may occur in the external pressure sensed by the pressure sensor due to the influence of temperature. Thus, a temperature sensor for sensing the temperature is further required to accurately measure the external pressure, i.e., to correct the error due to changes in temperature.

Conventionally, to integrate such pressure and temperature sensors into a sensor, they are separately fabricated and then packed on a semiconductor substrate or the like. The integrated sensor is bulky and consumes a relatively large amount of power. Accordingly, there is a need for a method that can integrate sensors into a more compact structure so as to be effectively adopted in MEMS.

Also, when the temperature sensor measures temperature, an error may occur in the measured temperature due to the external pressure. Therefore, a method of accurately measuring temperature using the temperature sensor without being affected by the external pressure is also required.

SUMMARY OF THE INVENTION

Accordingly, the present invention has been achieved to solve the above-mentioned problems, and an object of the present invention is to provide a monolithic multi-functional integrated sensor in which a pressure sensor and a temperature sensor are integrated on one chip so as to accurately measure both pressure and temperature and a method for fabricating the same.

The above object of the present invention has been achieved by providing a monolithic multi-functional integrated sensor including: a pressure sensor including a plurality of piezoresistors having resistance values which vary with a change in external pressure, the piezoresistors being disposed in a direction so as to be subject to a piezoresistive effect produced by the external pressure at or beyond a predetermined first level; and a temperature sensor including a resistor having a resistance value which varies with a change in temperature, the resistor being disposed in a direction so as to be subject to a piezoresistive effect produced by the external pressure below a predetermined second level.

When external pressure is applied in a z-axis direction 001, the plurality of piezoresistors of the pressure sensor may be disposed within ±5° in an x-axis direction 100 or within ±5° in a y-axis direction 010.

The plurality of piezoresistors of the pressure sensor may be disposed in a direction able to maximize a piezoresistive effect produced by the external pressure, and the resistor of the temperature sensor may be disposed in a direction able to minimize the piezoresistive effect produced by the external pressure.

When external pressure is applied in a z-axis direction 001, the plurality of piezoresistors of the pressure sensor may be disposed in one of an x-axis direction 100 and a y-axis direction 010.

The plurality of piezoresistors may be patterns which zigzag alternately a predetermined number of times in the x-axis direction 100 and the y-axis direction 010.

When external pressure is applied in the z-axis direction 001, the resistor of the temperature sensor may be disposed from about 40° to about 50° or, from about −50° to about −40° with respect to the y-axis direction 010 on an x-y plane.

When external pressure is applied in the z-axis direction 001, the resistor of the temperature sensor may be disposed in one of a direction 110 of about 45° and a direction −110 of about −45° with respect to the y-axis direction 010 on an x-y plane.

The resistor may be a pattern which zigzags alternately a predetermined number of times in the 110 and −110 directions.

An angle between the disposed direction of the plurality of piezoresistors and the disposed direction of the resistor may range from about 40° to about 50°.

An angle between the disposed direction of the plurality of piezoresistors and the disposed direction of the resistor may be about 45°.

According to another aspect, the present invention provides a method for fabricating a monolithic multi-functional integrated sensor for sensing external pressure and temperature, including: forming a plurality of piezoresistors having resistance values which vary with a change in external pressure in a direction so as to be subject to a piezoresistive effect produced by the external pressure at or beyond a predetermined first level; and forming a resistor having a resistance value which varies with a change in temperature in a direction so as to be subject to a piezoresistive effect produced by the external pressure below a predetermined second level.

When external pressure is applied in a z-axis direction 001, the plurality of piezoresistors of the pressure sensor may be disposed within ±5° in an x-axis direction 100 or within ±5° in a y-axis direction 010.

The plurality of piezoresistors of the pressure sensor may be disposed in a direction able to maximize a piezoresistive effect produced by the external pressure, and the resistor of the temperature sensor may be disposed in a direction able to minimize the piezoresistive effect produced by the external pressure.

When the external pressure is applied in a z-axis direction 001, the plurality of piezoresistors may be formed in one of an x-axis direction 100 and a y-axis direction 010.

The plurality of piezoresistors may be each formed in a pattern which zigzags alternately a predetermined number of times in the x-axis direction 100 and the y-axis direction 010.

When external pressure is applied in the z-axis direction 001, the resistor of the temperature sensor may be disposed from about 40° to about 50° or from about −50° to about −40° with respect to the y-axis direction 010 on an x-y plane.

When the external pressure is applied in the z-axis direction 001, the resistor is formed in one of a direction 110 of about 45° and a direction −110 of about −45° with respect to the y-axis direction 010 on an x-y plane.

The resistor may be formed in a pattern which zigzags alternately a predetermined number of times in the 110 and −110 directions.

An angle between the disposed direction of the plurality of piezoresistors and the disposed direction of the resistor may range from about 40° to about 50°.

An angle between the disposed direction of the plurality of piezoresistors and the disposed direction of the resistor may be about 45°.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

The present invention will now be described in greater detail with reference to the accompanying drawings. However, the present invention should not be construed as being limited thereto.

Figure 1:
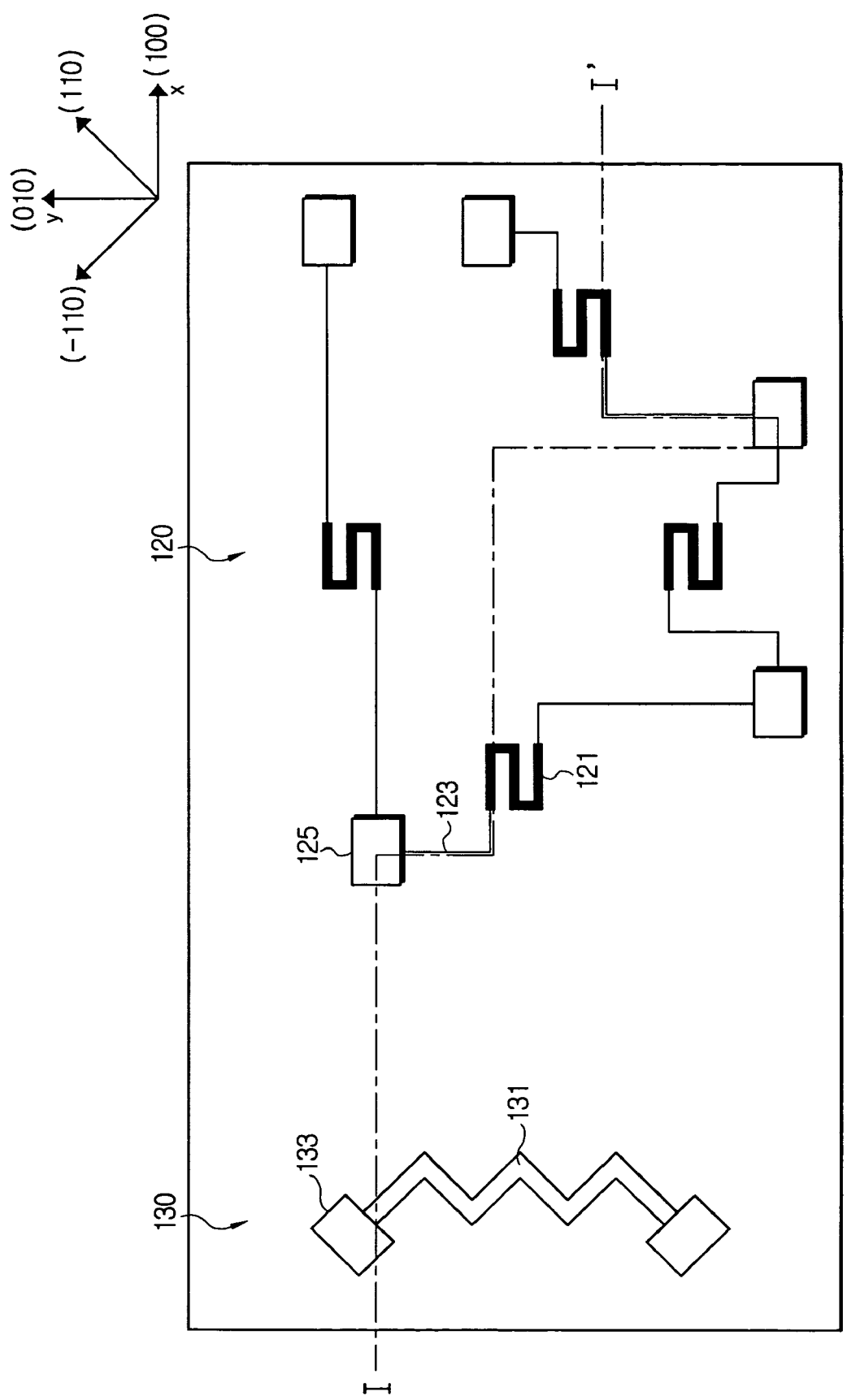
FIG. 1 is a plan view of a monolithic multi-functional integrated sensor, according to an embodiment of the present invention.
Figure 2:
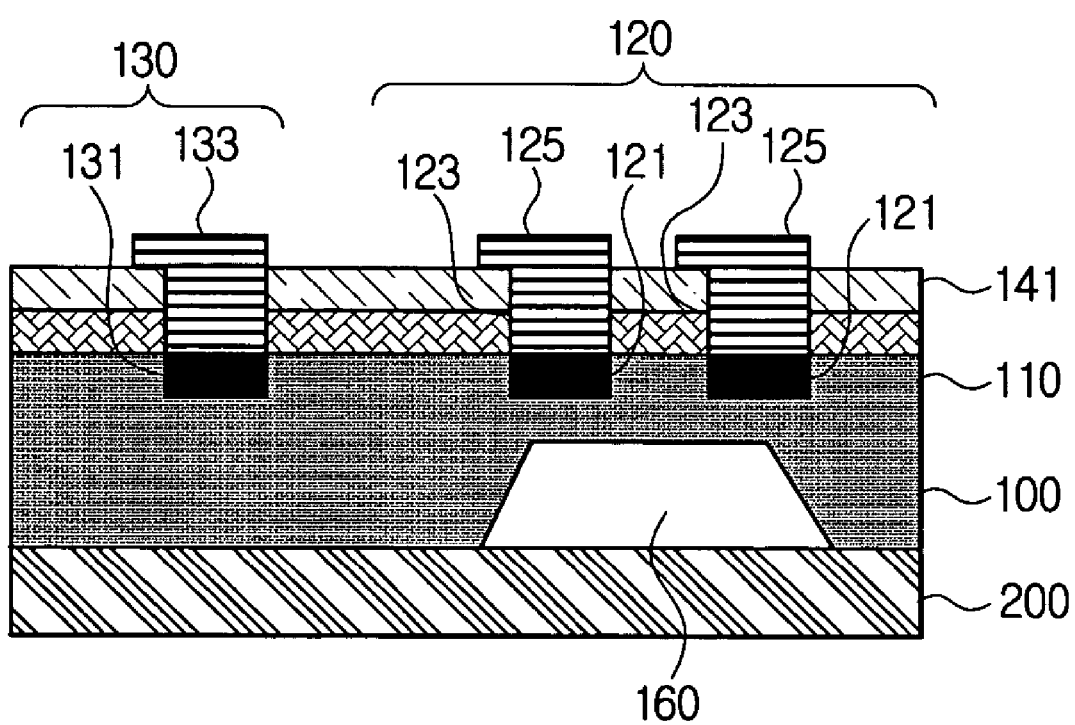
FIG. 2 is a cross-sectional view of the monolithic multi-functional integrated sensor of FIG. 1, taken along line I–I'.

Referring to FIGS. 1 and 2, a MEMS multi-functional sensor is embodied as a chip into which silicon wafer 100 and a pressure sensor 120 and a temperature sensor 130 formed thereon are integrated.

A $SiO_2$ layer 110 and a first $Si_3N_4$ layer 141 are formed on an upper surface of the silicon wafer 100, and a glass substrate 200 is bonded to a lower surface of the silicon wafer 100.

Also, a plurality of piezoresistors 121 and a resistor 131 are formed on the silicon wafer 100. A vacuum chamber 160 is formed in an area of the silicon wafer 100 facing lower portions of the piezoresistors 121 so as to vary stress applied thereto with a variation in external pressure.

The pressure sensor 120 is a piezoresistive type sensor and includes a plurality of piezoresistors 121, a plurality of wires 123, and a plurality of electrodes 125.

The piezoresistors 121 are formed by doping a predetermined area of the silicon wafer 100 with a boron ion $B^+$ of predetermined thickness. The piezoresistors 121 are coupled to the electrodes 125 by the wires 123.

When external pressure is applied, stress corresponding to the external pressure is produced on the silicon wafer 100. Resistance values of the plurality of piezoresistors 121 formed on the silicon wafer 100 vary with a variation in the stress. An external circuit (not shown) detects voltage values corresponding to the variations in the resistance values of the piezoresistors 121 so as to measure the external pressure.

The piezoresistors 121 are preferably disposed so as to maximize a piezoresistive effect resulting from a variation in external pressure. In this case, variations in the resistance values of the piezoresistors 121 in response to a variation in external pressure may be maximized to more accurately sense the external pressure. If there are constraints in disposing the piezoresistors 121 to maximize a piezoresistive effect resulting from a variation in external pressure, the piezoresistors 121 may be disposed so as to increase a piezoresistive effect resulting from a variation in external pressure at or beyond a predetermined level.

From a direction indicator shown on the right top of FIG. 1, in a case where the external pressure is applied in a z-axis direction (not shown) 001, the piezoresistors 121 are disposed in an x-axis direction 100 or a y-axis direction 010 so as to maximize the piezoresistive effect. Thus, the variations in the resistance values of the piezoresistors 121 are maximized. As a result, the sensitivity of the pressure sensor to external pressure can be increased. Meanwhile, if there are constraints in disposing the piezoresistors 121 in x-axis direction 100 or a y-axis direction 010, the piezoresistors 121 may preferably be disposed within ±5° in an x-axis direction 100 or within ±5° in a y-axis direction 010.

Accordingly, the plurality of piezoresistors 121 shown in FIG. 1 are disposed in the x-axis direction 100 or the y-axis direction 010. The piezoresistors 121 each have a pattern which zigzags alternately in the x-axis direction 100 and the y-axis direction 010. As a result, since the piezoresistors 121 are disposed in the x-axis direction 100 or the y-axis direction 010, the piezoresistors 121 have excellent pressure sensitivity.

The temperature sensor 130 detects a resistance value to sense the temperature and includes a resistor 131 and pads 133. The resistor 131 is made of a material having a resistance value that is proportional to a variation in temperature, for example, Pt, Ni, polysilicon, or the like. The pads 133 are formed at both ends of the resistor 131 to be coupled to an external circuit (not shown).

The temperature sensor 130 can accurately sense the temperature when the resistance value of the resistor 131 varies with a change in temperature. In other words, if the resistance value of the resistor 131 varies due to factors other than the temperature, an error occurs in the temperature measurement. However, a piezoresistive effect may be produced on the resistor 131 due to a variation in external pressure. Here, the resistance value of the resistor 131 varies due to the piezoresistive effect, which causes an error in sensing the temperature.

Accordingly, the resistor 131 is preferably disposed so as to minimize the piezoresistive effect produced by variation in the external pressure. In this case, the variation in the resistance value of the resistor 131 caused by a change in external pressure is minimized so as to accurately sense the temperature. If there are constraints in disposing the resistor 131 to minimize the piezoresistive effect produced by variation in the external pressure, the resistor 131 of the temperature sensor may be disposed so as to cause the piezoresistive effect produced by the external pressure below a predetermined level.

From the direction indicator shown on the right top of FIG. 1, when the external pressure is applied in the z-axis direction (not shown) 001, the resistor 131 is disposed in a direction of ±45° with respect to the y-axis, i.e., a direction 110 or −110, so that a piezoresistive coefficient is "0". Thus, the piezoresistive effect is minimized. As a result, variation in the resistance value of the resistor 131 caused by a variation in external pressure is minimized, and thus the sensitivity of the temperature measurement can be increased. If there are constraints in disposing the resistor 131 in a direction of ±45° with respect to the y-axis, the resistor 131 may preferably be disposed from about 40° to about 50° with respect to the y-axis direction 010, or, from about −50° to about −40° with respect to the y-axis direction 010 on an x-y plane.

Therefore, the resistor 131 shown in FIG. 1 is disposed in the 110 or −110 directions. The resistor 131 has a pattern which zigzags alternately in the 110 and −110 directions. Since the resistor 131 is disposed in the 110 or −110 directions, the resistor 131 has excellent temperature sensitivity. Here, an angle between the disposed direction of the resistor 131 and the disposed direction of the plurality of piezoresistors 121 is about 45°.

A method for fabricating the monolithic multi-functional integrated sensor of FIG. 1 will now be described in detail with reference to FIGS. 3A through 3H.

Figure 3A:
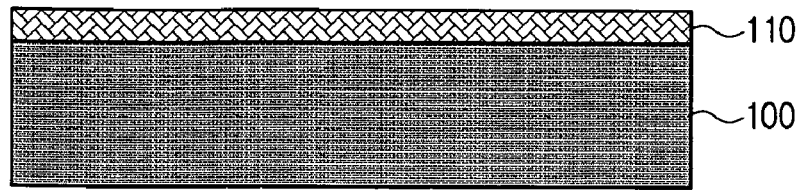
FIGS. 3A through 3H are cross-sectional views of steps of a method for fabricating the monolithic multi-functional integrated sensor.

As shown in FIG. 3A, $SiO_2$ is deposited on the upper surface of the silicon wafer 100 to a predetermined thickness to form the $SiO_2$ layer 110.

Figure 3B:
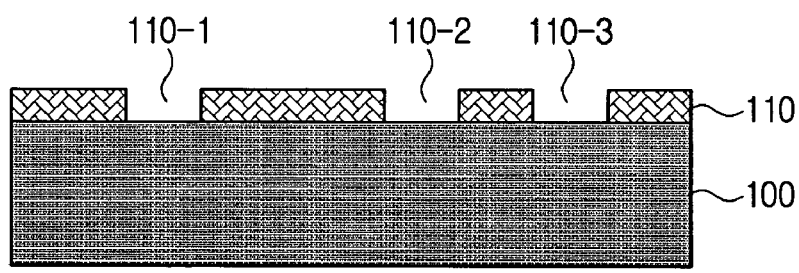

As shown in FIG. 3B, the $SiO_2$ layer 110 is patterned using a photolithographic process to form a pattern 110-1 of a resistor of a temperature sensor and patterns 110-2 and 110-3 of piezoresistors of a pressure sensor.

Here, the pattern 110-1 of the resistor of the temperature sensor zigzags alternately in the 110 and −110 directions to minimize the piezoresistive effect produced by a variation in external pressure and so as to minimize variation in the resistance value of the resistor.

The patterns 110-2 and 110-3 of the piezoresistors of the pressure sensor zigzag alternately in the x-axis direction 100 and the y-axis direction 010 to maximize the piezoresistive effect produced by a change in external pressure so as to maximize resistance values of the piezoresistors.

Figure 3C:
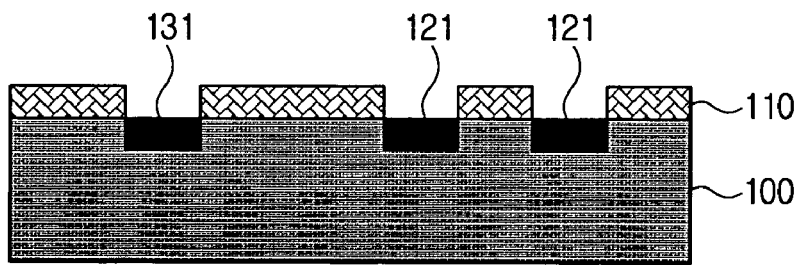

As shown in FIG. 3C, a corresponding portion of the silicon wafer 100 is doped with boron ion $B^+$ using a diffusion method, an alloying method, an ion implantation method, or the like to form the piezoresistors 121 of the pressure sensor and the resistor 131 of the temperature sensor.

Figure 3D:
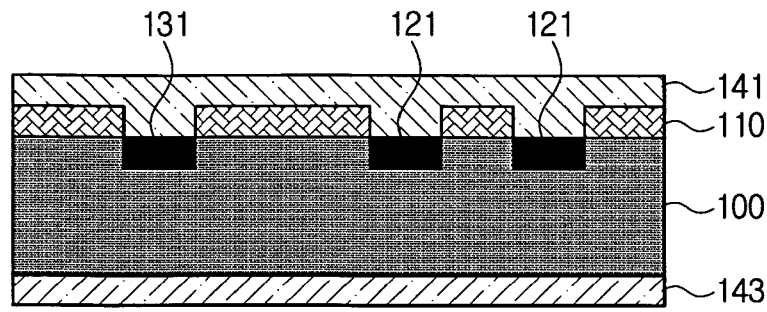

As shown in FIG. 3D, using Low Pressure Chemical Vapor Deposition (LPCVD), a first $Si_3N_4$ layer 141 is formed on the $SiO_2$ layer 110, the piezoresistors 121, and the resistor 131, and then a second $Si_3N_4$ layer 143 is formed on the lower surface of the silicon wafer 100.

Figure 3E:
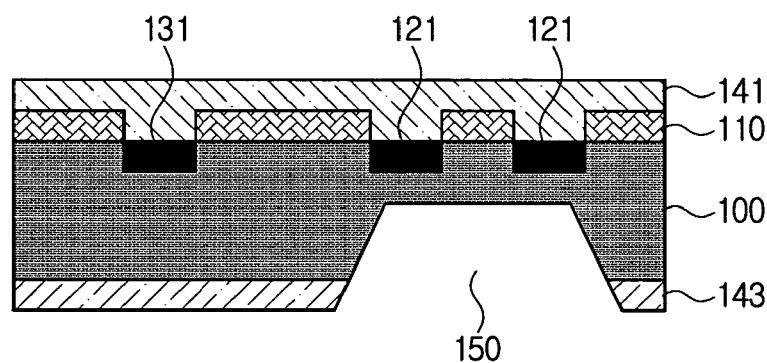

As shown in FIG. 3E, an area of the silicon wafer 100 and an area of the second $Si_3N_4$ layer 143 facing the lower portions of the piezoresistors 121 are etched to form a cavity 150.

Figure 3F:
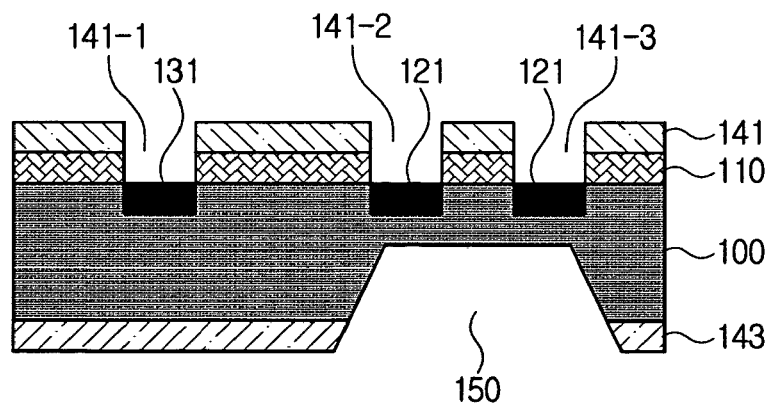

As shown in FIG. 3F, the first $Si_3N_4$ layer 141 is etched according to patterns corresponding to the piezoresistors 121 and the resistor 131 to form holes 141-1, 141-2, and 141-3 and so as to expose the piezoresistors 121 and the resistor 131.

Figure 3G:
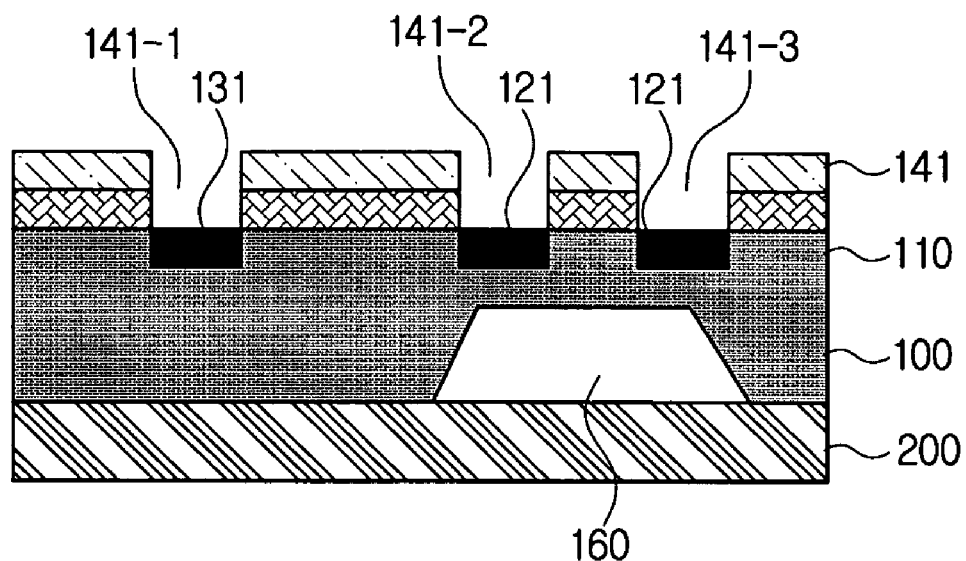

As shown in FIG. 3G, the second $Si_3N_4$ layer 143 is removed. Next, the silicon wafer 100 is bonded to the glass substrate 200 using eutectic bonding to form the vacuum chamber 160.

Figure 3H:
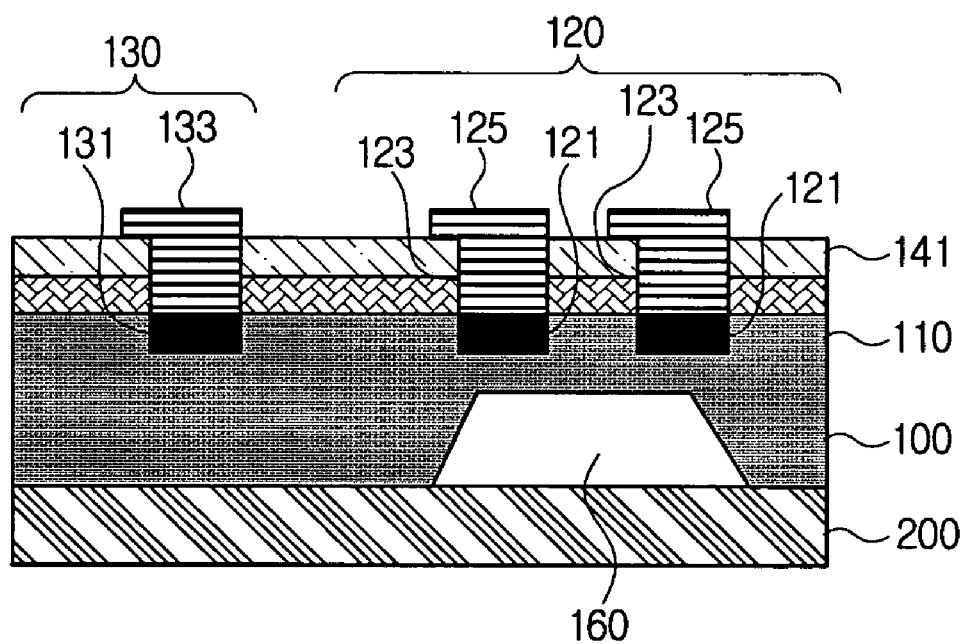

As shown in FIG. 3H, a conductive material such as Al or the like is deposited to fill the holes 141-1, 142-2, and 141-3 and simultaneously to form a conductive layer having a predetermined thickness on the first $Si_3N_4$ layer 141. Also, the conductive layer is etched according to predetermined patterns to form the wires 123 and the electrodes 125 of the pressure sensor 120 and the pads 133 of the resistor 131.

In the present embodiment, the monolithic multi-functional integrated sensor in which the pressure sensor 120 and the temperature sensor 130 are integrated on one chip has been described. However, this is only an example. The technical spirit of the present invention can be applied even when the pressure sensor 120 and the temperature sensor 130 are separately embodied. For example, a temperature sensor 130 alone capable of minimizing the piezoresistive effect produced by a variation in the external pressure may be embodied in accordance with the present invention.

As described above, according to the present invention, a pressure sensor and a temperature sensor can be integrated on one chip and can more accurately sense pressure and temperature, respectively. In particular, the temperature sensor can reduce errors in sensing temperature that may occur due to a piezoresistive effect produced by a variation in external pressure.

The foregoing embodiment and advantages are merely exemplary and are not to be construed as limiting the present invention. The present teachings can be readily applied to other types of apparatuses. Also, the description of the embodiments of the present invention is intended to be illustrative, and not to limit the scope of the claims, and various alternatives, modifications, and variations will be apparent to those skilled in the art.

What is claimed is:

1. A monolithic multi-functional integrated sensor comprising:
    a pressure sensor comprising a plurality of piezoresistors having resistance values which vary with a change in external pressure, the piezoresistors being disposed in a direction so as to be subject to a piezoresistive effect produced by the external pressure at or beyond a predetermined first level; and
    a temperature sensor comprising a resistor having a resistance value which varies with a change in temperature, the resistor being disposed in a direction so as to be subject to a piezoresistive effect produced by the external pressure below a predetermined second level.

2. The monolithic multi-functional integrated sensor of claim 1, wherein when external pressure is applied in a z-axis direction 001, the plurality of piezoresistors of the pressure sensor are disposed within ±5° in an x-axis direction 100 or within ±5° in a y-axis direction 010.

3. The monolithic multi-functional integrated sensor of claim 1, wherein the piezoresistors are disposed in a direction which maximizes a piezoresistive effect produced by the external pressure, and the resistor is disposed in a direction which minimizes the piezoresistive effect produced by the external pressure.

4. The monolithic multi-functional integrated sensor of claim 3, wherein when the external pressure is applied in a z-axis direction 001, the plurality of piezoresistors of the pressure sensor are disposed in one of an x-axis direction 100 and a y-axis direction 010.

5. The monolithic multi-functional integrated sensor of claim 4, wherein the plurality of piezoresistors are patterns which zigzag alternately a predetermined number of times in the x-axis direction 100 and the y-axis direction 010.

6. The monolithic multi-functional integrated sensor of claim 1, wherein when external pressure is applied in the z-axis direction 001, the resistor of the temperature sensor is disposed from about 40° to about 50° or from about −50° to about −40° with respect to the y-axis direction 010 on an x-y plane.

7. The monolithic multi-functional integrated sensor of claim 6, wherein when the external pressure is applied in a z-axis direction 001, the resistor of the temperature sensor is disposed in one of a direction 110 of about 45° and a direction −110 of about −45° with respect to a y-axis direction 010 on an x-y plane.

8. The monolithic multi-functional integrated sensor of claim 7, wherein the resistor is a pattern which zigzags alternately a predetermined number of times in the 110 and −110 directions.

9. The monolithic multi-functional integrated sensor of claim 1, wherein an angle between the disposed direction of the plurality of piezoresistors and the disposed direction of the resistor ranges from about 40° to about 50°.

10. The monolithic multi-functional integrated sensor of claim 9, wherein an angle between the disposed direction of the plurality of piezoresistors and the disposed direction of the resistor is about 45°.

11. A method for fabricating a monolithic multi-functional integrated sensor for sensing external pressure and temperature, comprising:
    forming a plurality of piezoresistors having resistance values which vary with a change in external pressure in a direction so as to be subject to a piezoresistive effect produced by the external pressure beyond a predetermined first level; and
    forming a resistor having a resistance value which varies with a change in temperature in a direction so as to be subject to a piezoresistive effect produced by the external pressure below a predetermined second level.

12. The method of claim 11, wherein when external pressure is applied in a z-axis direction 001, the plurality of piezoresistors of the pressure sensor are disposed within ±5° in an x-axis direction 100 or within ±5° in a y-axis direction 010.

13. The method of claim 11, wherein the piezoresistors are disposed in a direction which maximizes a piezoresistive effect produced by the external pressure, and the resistor is disposed in a direction which minimizes the piezoresistive effect produced by the external pressure.

14. The method of claim 13, wherein when the external pressure is applied in a z-axis direction 001, the plurality of piezoresistors are formed in one of an x-axis direction 100 and a y-axis direction 010.

15. The method of claim 14, wherein the plurality of piezoresistors are each formed in a pattern which zigzags alternately a predetermined number of times in the x-axis direction 100 and the y-axis direction 010.

16. The method of claim 11, wherein when external pressure is applied in the z-axis direction 001, the resistor of the temperature sensor may be disposed from about 40° to about 50° or from about −50° to about −40° with respect to the y-axis direction 010 on an x-y plane.

17. The method of claim 16, wherein when the external pressure is applied in a z-axis direction 001, the resistor is formed in one of a direction 110 of about 45° and a direction −110 of about −45° with respect to the y-axis direction 010 on an x-y plane.

18. The method of claim 17, wherein the resistor is formed in a pattern which zigzags alternately a predetermined number of times in the 110 and −110 directions.

19. The method of claim 11, wherein an angle between the disposed direction of the plurality of piezoresistors and the disposed direction of the resistor ranges from about 40° to about 50°.

20. The method of claim 19, wherein an angle between the disposed direction of the plurality of piezoresistors and the disposed direction of the resistor is about 45°.

* * * * *